United States Patent
Bitauld

(10) Patent No.: US 9,692,508 B2
(45) Date of Patent: Jun. 27, 2017

(54) DIRECTIONAL OPTICAL COMMUNICATIONS

(71) Applicant: Nokia Technologies Oy, Espoo (FI)

(72) Inventor: David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/898,210

(22) PCT Filed: Jul. 1, 2013

(86) PCT No.: PCT/IB2013/055399
§ 371 (c)(1),
(2) Date: Dec. 14, 2015

(87) PCT Pub. No.: WO2015/001381
PCT Pub. Date: Jan. 8, 2015

(65) Prior Publication Data
US 2016/0134367 A1  May 12, 2016

(51) Int. Cl.
| H04B 10/00 | (2013.01) |
| H04B 10/116 | (2013.01) |
| H04B 10/114 | (2013.01) |
| H04L 9/08 | (2006.01) |
| H04B 10/079 | (2013.01) |
| H04N 9/31 | (2006.01) |

(52) U.S. Cl.
CPC ..... *H04B 10/116* (2013.01); *H04B 10/07955* (2013.01); *H04B 10/1141* (2013.01); *H04B 10/1149* (2013.01); *H04L 9/0852* (2013.01); *H04L 9/0855* (2013.01); *H04N 9/3138* (2013.01); *H04L 2209/24* (2013.01)

(58) Field of Classification Search
USPC .................................................. 398/118–135
See application file for complete search history.

(56) References Cited

U.S. PATENT DOCUMENTS

| 4,647,927 | A | * | 3/1987 | Ichikawa | G09G 3/20 345/55 |
| 5,059,008 | A | * | 10/1991 | Flood | G02B 26/0875 349/202 |
| 5,119,226 | A | * | 6/1992 | Allen | H04B 10/1149 398/100 |
| 5,233,184 | A | * | 8/1993 | Chirovsky | G02F 3/028 250/214 LS |

(Continued)

FOREIGN PATENT DOCUMENTS

| CN | 1334949 A | 2/2002 |
| GB | 2460252 | 11/2009 |

(Continued)

OTHER PUBLICATIONS

International Search Report adn Written Opinion received for corresponding Patent Cooperation Treaty Application No. PCT/IB2013/055399 , dated Feb. 27, 2014, 14 pages.

*Primary Examiner* — Agustin Bello
(74) *Attorney, Agent, or Firm* — Harrington & Smith

(57) ABSTRACT

Directional optical communications are provided between devices such as at least one pixel is selected from an array of pixels provided by an image projecting device for emitting light from an emitting device towards a target area of a receiving device. Light is then emitted by the selected at least one pixel towards the target area.

17 Claims, 9 Drawing Sheets

(56) References Cited

U.S. PATENT DOCUMENTS

| | | | | |
|---|---|---|---|---|
| 5,666,226 A * | 9/1997 | Ezra | G02F 1/133526 | 348/E3.015 |
| 5,777,318 A * | 7/1998 | Krishnamoorthy | B82Y 20/00 | 250/214 LS |
| 5,793,880 A * | 8/1998 | Constant | H04N 21/4382 | 340/815.4 |
| 6,038,005 A * | 3/2000 | Handschy | G02B 27/1033 | 349/57 |
| 6,101,299 A * | 8/2000 | Laor | G02B 6/3588 | 385/16 |
| 6,509,992 B1 * | 1/2003 | Goodwill | H04B 10/1141 | 398/129 |
| 6,606,175 B1 * | 8/2003 | Sampsell | H04B 10/1141 | 398/140 |
| 6,624,916 B1 * | 9/2003 | Green | H04B 10/11 | 398/169 |
| 6,775,480 B1 * | 8/2004 | Goodwill | H04B 10/11 | 398/119 |
| 6,934,477 B2 * | 8/2005 | Willebrand | H04B 10/1125 | 359/341.1 |
| 7,343,099 B2 * | 3/2008 | Wirth | G02B 26/06 | 398/123 |
| 7,643,755 B2 * | 1/2010 | Rafferty | H04B 10/118 | 398/118 |
| 7,809,278 B2 * | 10/2010 | Morris | H04B 10/1143 | 398/129 |
| 7,972,271 B2 * | 7/2011 | Johnson | A61B 8/14 | 600/459 |
| 7,978,981 B2 * | 7/2011 | Buckman | H04B 10/801 | 398/118 |
| 8,045,864 B2 * | 10/2011 | Ann | H04B 10/1121 | 398/172 |
| 8,611,758 B2 * | 12/2013 | Kuo | H04B 10/803 | 398/118 |
| 8,681,185 B2 * | 3/2014 | Guncer | G09G 3/2022 | 345/204 |
| 8,970,646 B2 * | 3/2015 | Guncer | G09G 3/3426 | 345/55 |
| 9,450,671 B2 * | 9/2016 | Chen | H04B 10/1141 | |
| 2002/0186383 A1 * | 12/2002 | Obrador | G06K 15/02 | 358/1.2 |
| 2003/0123882 A1 * | 7/2003 | Izadpanah | H04B 10/1121 | 398/119 |
| 2004/0161239 A1 * | 8/2004 | Bruesselbach | H04B 10/112 | 398/131 |
| 2005/0101867 A1 * | 5/2005 | Johnson | A61B 8/14 | 600/459 |
| 2005/0280662 A1 * | 12/2005 | Tognoni | G09G 5/20 | 345/690 |
| 2007/0208254 A1 * | 9/2007 | Johnson | A61B 8/14 | 600/459 |
| 2008/0008472 A1 * | 1/2008 | Dress | H04B 10/803 | 398/66 |
| 2008/0044188 A1 | 2/2008 | Kagawa et al. | | |
| 2008/0063410 A1 * | 3/2008 | Irie | H04B 10/1143 | 398/182 |
| 2008/0185521 A1 * | 8/2008 | Hollingsworth | B82Y 20/00 | 250/338.1 |
| 2008/0298812 A1 * | 12/2008 | Nagatomo | H04B 10/1149 | 398/173 |
| 2009/0110406 A1 * | 4/2009 | Morris | H04B 10/1121 | 398/131 |
| 2009/0269073 A1 * | 10/2009 | Kitaji | H04B 10/1149 | 398/130 |
| 2009/0269074 A1 * | 10/2009 | Tidhar | H04B 10/1143 | 398/130 |
| 2010/0007804 A1 * | 1/2010 | Guncer | G09G 3/3426 | 348/790 |
| 2010/0165134 A1 * | 7/2010 | Dowski, Jr. | B24B 13/06 | 348/218.1 |
| 2010/0207546 A1 * | 8/2010 | Jung | H05B 33/0818 | 315/297 |
| 2010/0225679 A1 * | 9/2010 | Guncer | G09G 3/2022 | 345/690 |
| 2011/0063510 A1 * | 3/2011 | Lee | G02F 1/133605 | 348/563 |
| 2012/0020582 A1 * | 1/2012 | Le Leannec | H04N 19/176 | 382/239 |
| 2012/0076509 A1 * | 3/2012 | Gurovich | H04B 10/60 | 398/212 |
| 2012/0087677 A1 * | 4/2012 | Jang | H04B 10/116 | 398/183 |
| 2012/0155889 A1 * | 6/2012 | Kim | H04B 10/116 | 398/193 |
| 2012/0301155 A1 * | 11/2012 | Irie | H04B 10/116 | 398/182 |
| 2013/0251374 A1 * | 9/2013 | Chen | H04B 10/1141 | 398/118 |
| 2015/0036338 A1 * | 2/2015 | Gordin | F21K 9/90 | 362/235 |
| 2015/0257225 A1 * | 9/2015 | Yu | H05B 33/083 | 315/122 |
| 2016/0134367 A1 * | 5/2016 | Bitauld | H04B 10/07955 | 398/38 |

FOREIGN PATENT DOCUMENTS

| | | |
|---|---|---|
| GB | 2499693 | 8/2013 |
| WO | WO-99/49435 A1 | 9/1999 |
| WO | 0048338 | 8/2000 |

* cited by examiner

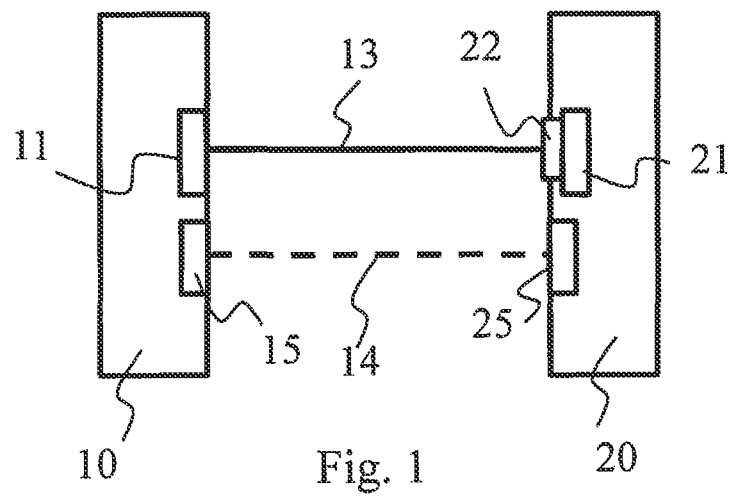
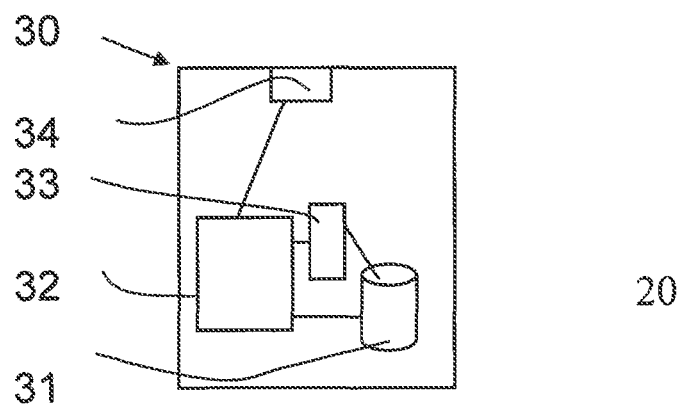
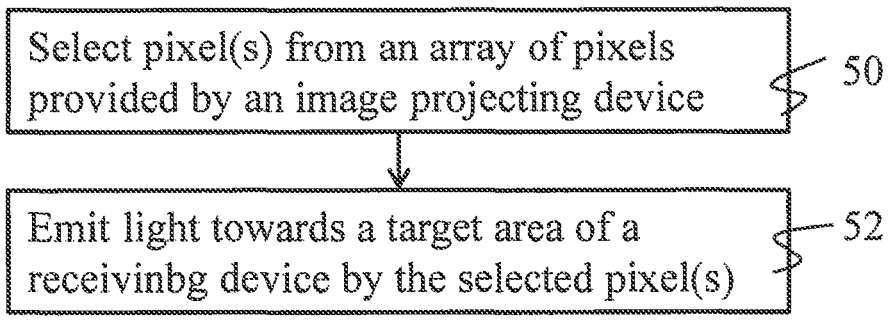

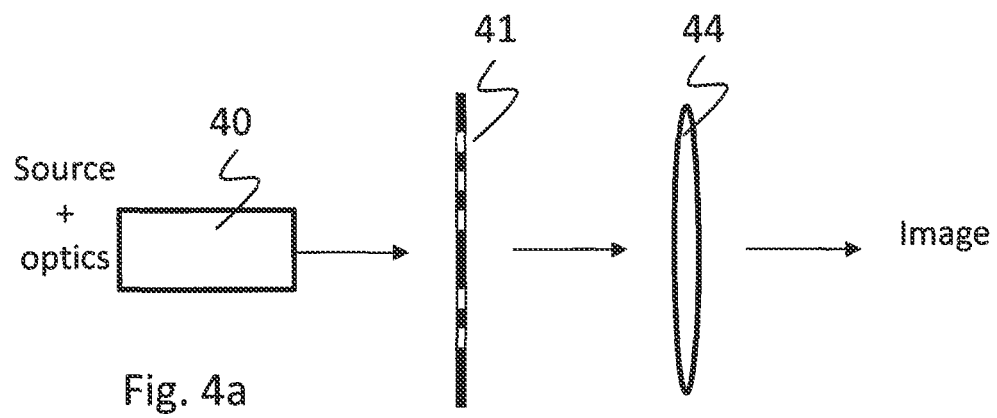
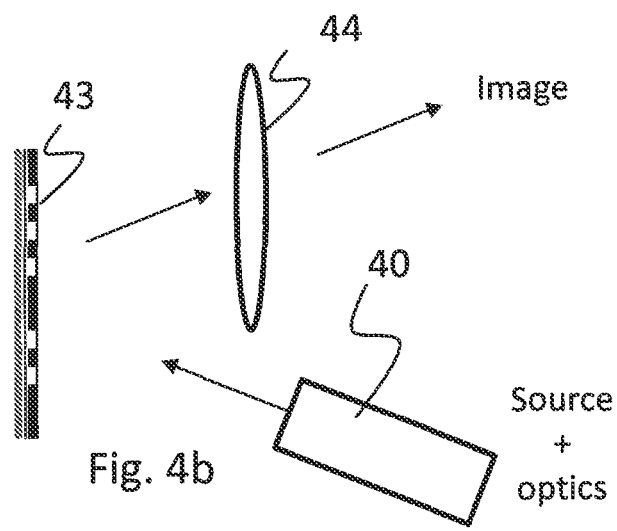
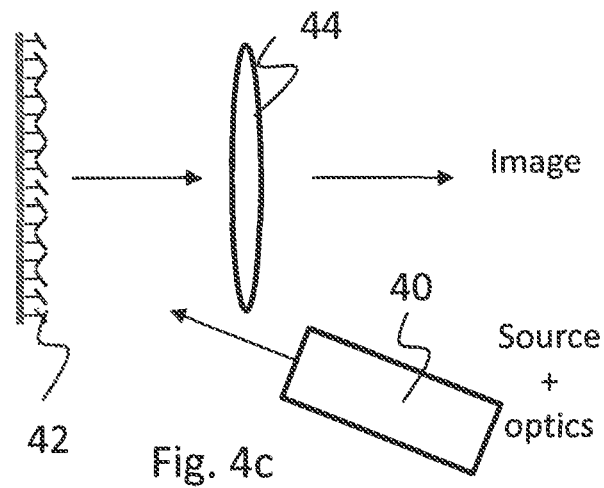

DIRECTIONAL OPTICAL COMMUNICATIONS

RELATED APPLICATION

This application was originally filed as PCT Application No. PCT/IB2013/055399 filed Jul. 1, 2013.

This disclosure relates to communications in free space and more particularly to directional optical communications.

Communications can be provided between devices such as fixed and/or mobile communication devices, base stations and other access points, servers, machine type devices, and so on. Communications may occur in free space over wireless connections. An example of communications in free space is information transfer using light as the physical mechanism. Optical links can be provided for communication of various types of information, for example for communications of control and user information and/or for security applications.

Directional free-space optical (FSO) communications has been used in many different contexts such as for example in close range communication, control and security applications. An example of FSO applications are high-bandwidth solutions where optical connectivity is provided to premises within the "last mile" of current optical fiber-based networks. FSO links are seen as advantageous for this type of deployment for example because FSO technology does not require Federal Communications Commission licensing, it is a viable transport medium for transmitting existing radio frequency (RF) signals in analogue format and it is considered immune to electromagnetic interference. Yet another example of applications of free space optical links is communication between different types of vehicles on land, on sea, airborne, or in space. More detailed examples of such applications include inter-vehicle traffic safety communications and communications in military context. FSO has also been proposed to be used for ultra-high-bandwidth communication in handheld devices. Directive optical links are also used for Quantum Key Distribution (QKD) which can be used to secure communications. It is noted that the above is not an exhaustive list of uses of FSO and that it is considered to have potential to extend to various new fields and applications in the future The directionality of communications allows a device to selectively communicate with another device out of several devices in the vicinity. A directional optical link is also a prerequisite for the Quantum Key Distribution enabling unconditionally secure communication.

To establish a directional optical link between two optical modules a module needs to adjust the direction of its beam, if it operates as an emitter, or its field of view, if the module operates as a receiver. Typically steering of directional free-space optical (FSO) beam is done by moving macroscopic elements, e.g. lenses, mirrors, and/or the whole module. This can set speed limitations, be a cause of sensitivity to shocks and vibrations, add bulky elements and so on.

It is noted that the issues discussed here are not limited to any particular apparatus and application but may occur in any context where optical links might be needed.

Embodiments of the invention aim to address one or several of the above issues.

In accordance with an aspect there is provided a method for providing directional optical communications, comprising selecting at least one pixel from an array of pixels provided by an image projecting device for emitting light towards a target area of a receiving device, and emitting light by the selected at least one pixel towards the target area.

In accordance with another aspect there is provided a an apparatus for controlling use of an image projecting device for directional optical communications, the apparatus comprising at least one processor, and at least one memory including computer program code, wherein the at least one memory and the computer program code are configured, with the at least one processor, cause the apparatus at least to select at least one pixel from an array of pixels provided by the image projecting device for emitting light towards a target area of a signal receiving device.

In accordance with yet another aspect there is provided an apparatus for directional optical communications, the apparatus comprising an image projecting device comprising at least one light source and configured to provide an array of pixels, and a controller configured to control directional emission of light by the pixels of the array to emit light towards a target area of a signal receiving device by selected at least one pixel.

In accordance with a more detailed aspect the number of light emitting pixels of the array of pixels is iteratively reduced.

The iterations may comprise dividing the array of pixels into sub-arrays, switching off pixels of an sub-array and emitting light by pixels of another sub-array, determining that the receiving device receives light emitted by the pixels of the light emitting array, dividing the light emitting sub-array into further sub-arrays, and repeating the switching off pixels, determining and dividing until the target area of the receiving device is determined. The light emitting array of pixels may be divided in two parts in each iteration round, and in each iteration round one of the two parts is selected, the one part producing a detectable signal.

The iterations may also comprise measuring background light intensity, switching on pixels in a first area of a measurement pattern and measuring received light intensity for the first area, successively switching on at least one second neighbouring area of the measurement pattern and measuring received light intensity for the at least one second area, determining whether any second area has light intensity greater than the light intensity if first area, and in response thereto, if a second area has a greater light intensity, moving the measurement pattern towards such second area, and if no second area has a greater light intensity, determining if the light intensity of the first area is significantly larger than the background light intensity.

Information of a reduced signal power may be used to determine that the target area is on a boundary between a switched-off sub-array and a light emitting sub-array of pixels.

The at least one pixel may be selected at least in part based on feedback from the receiver device. The feedback may comprise information on intensity of detected signal transmitted by pixels of the array of pixels.

Light may be emitted by one or more light sources of the image projecting device. According to a possibility at least one additional light source is provided in association with the image projecting device for emitting light for optical communications.

The image projecting device can produce the pixels by means of at least one of a transmission pixel array, a reflection pixel array, a digital mirror device, and light emitting pixels.

A beacon from the receiving device may be provided. A determination can be made for the selection of the at least one pixel for transmission towards the target area at least in part based on the beacon. A beam splitter and/or a reflector may be provided for guiding the beacon to a detector.

The communication may comprise at least one of communication according to a quantum key distribution protocol and communication of data.

At least one of the emitting device and the receiving device can be a mobile device.

A device such as a mobile communication device and/or a stationary or non-stationary device arranged to implement the embodiments can also be provided. A system comprising at least one of such devices can be provided.

A computer program comprising program code adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which:

FIG. 1 shows two communicating devices,

FIG. 2 shows an example of a control apparatus for a transmitting device,

FIG. 3 is a flowchart in accordance with an embodiment,

FIGS. 4a to 4c show schematic diagrams of transmitting devices,

Figure 6:
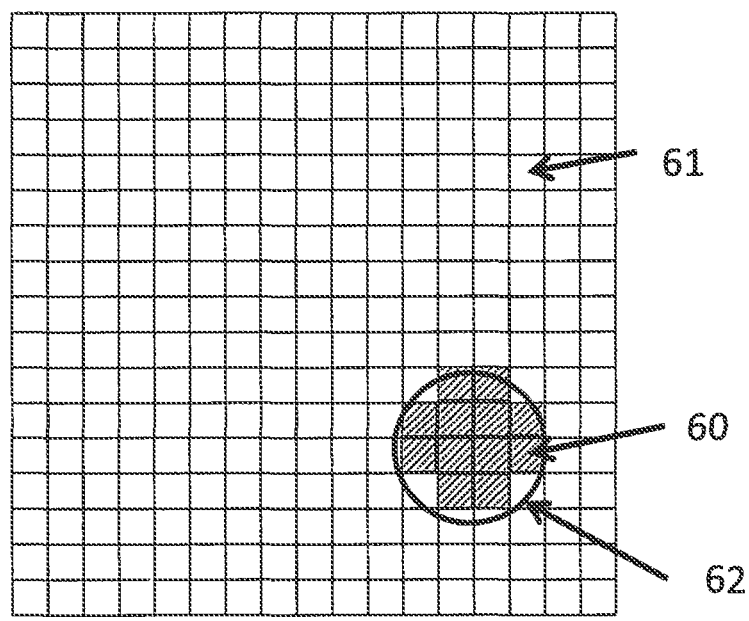
Figure 9:
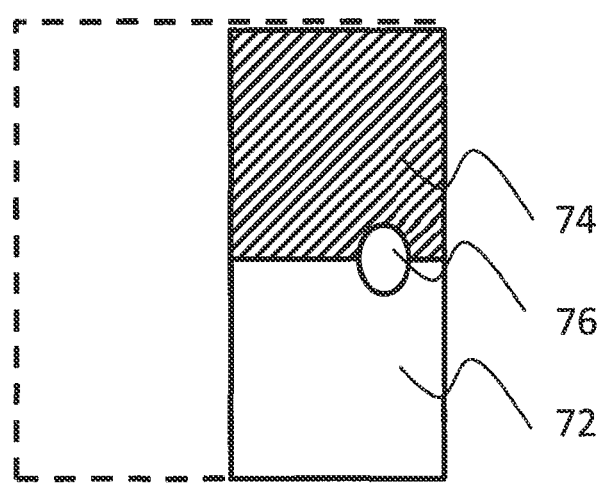
Figure 7A:
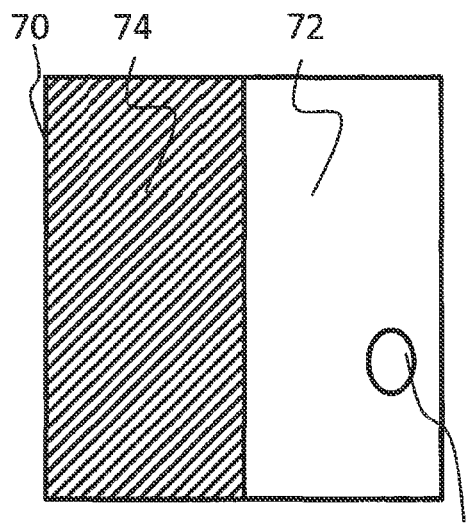
Figure 7B:
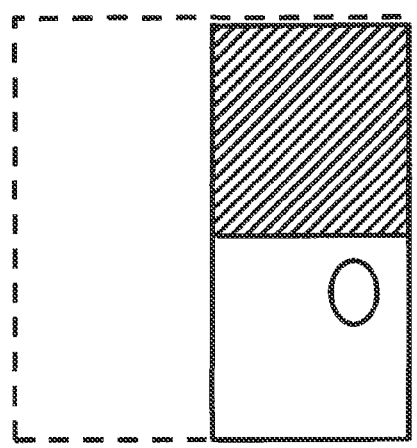
Figure 7C:
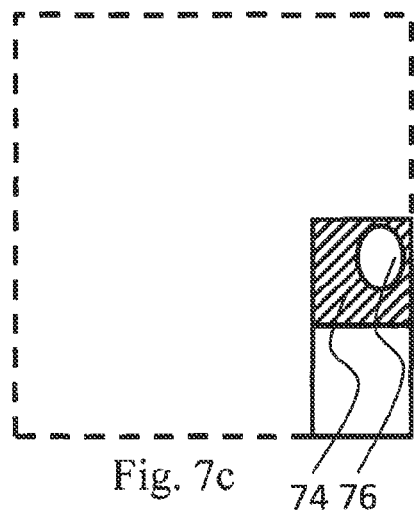
Figure 7D:
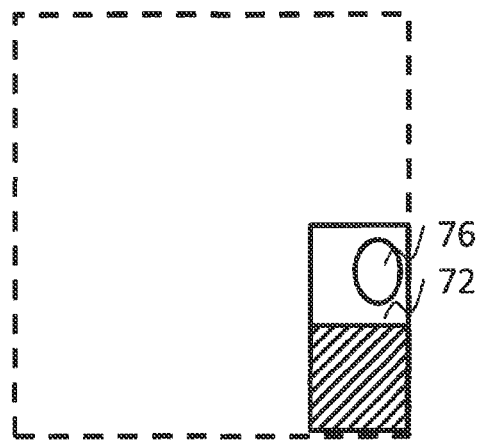
Figure 7E:
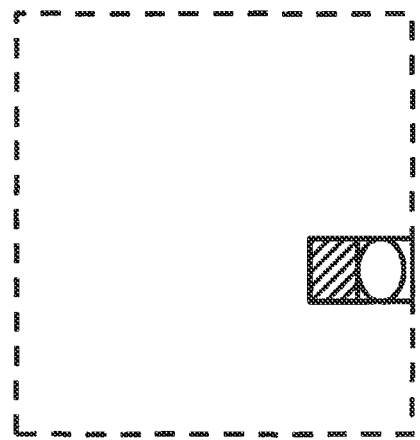
Figure 8:
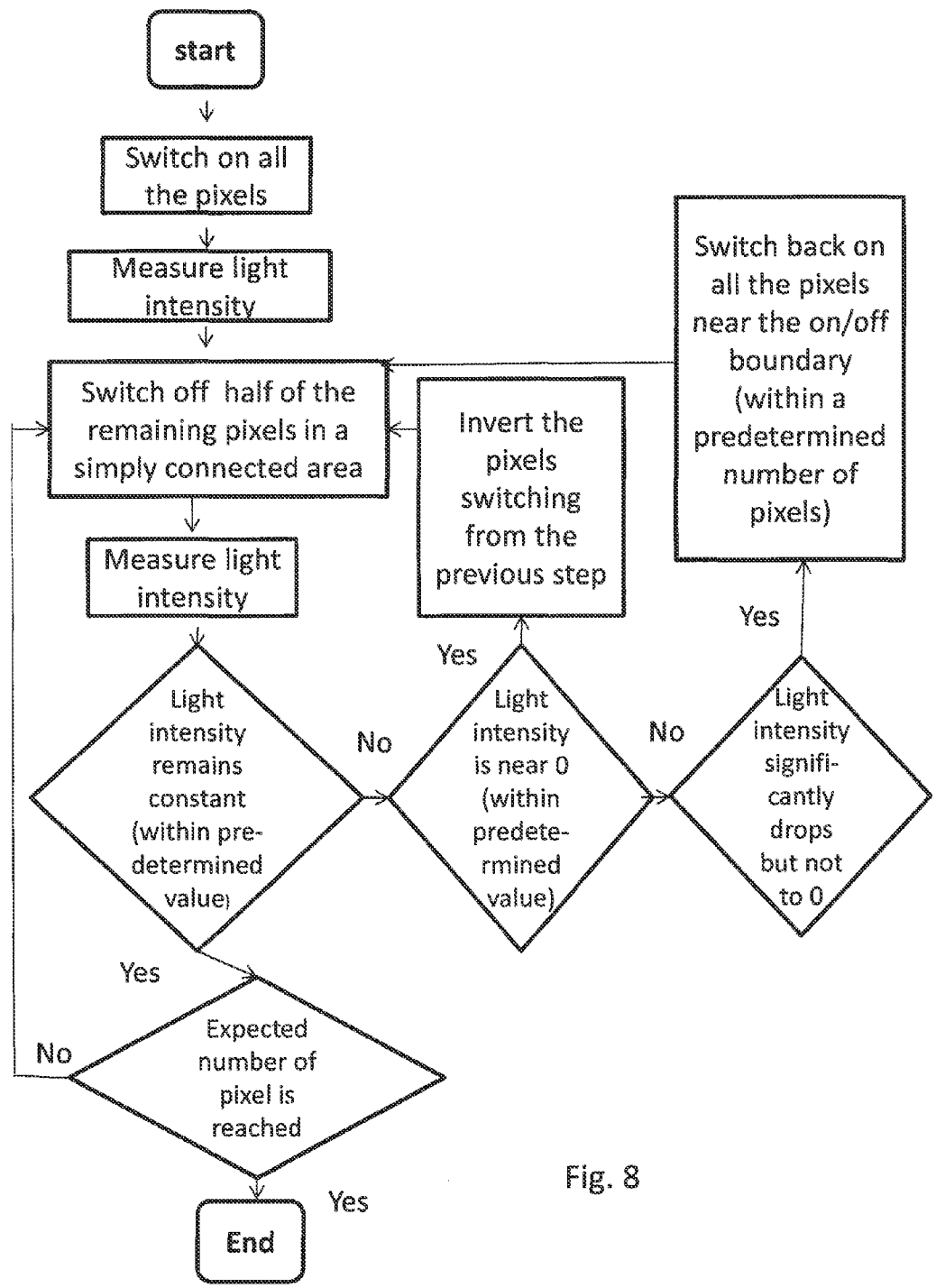
Figure 10:
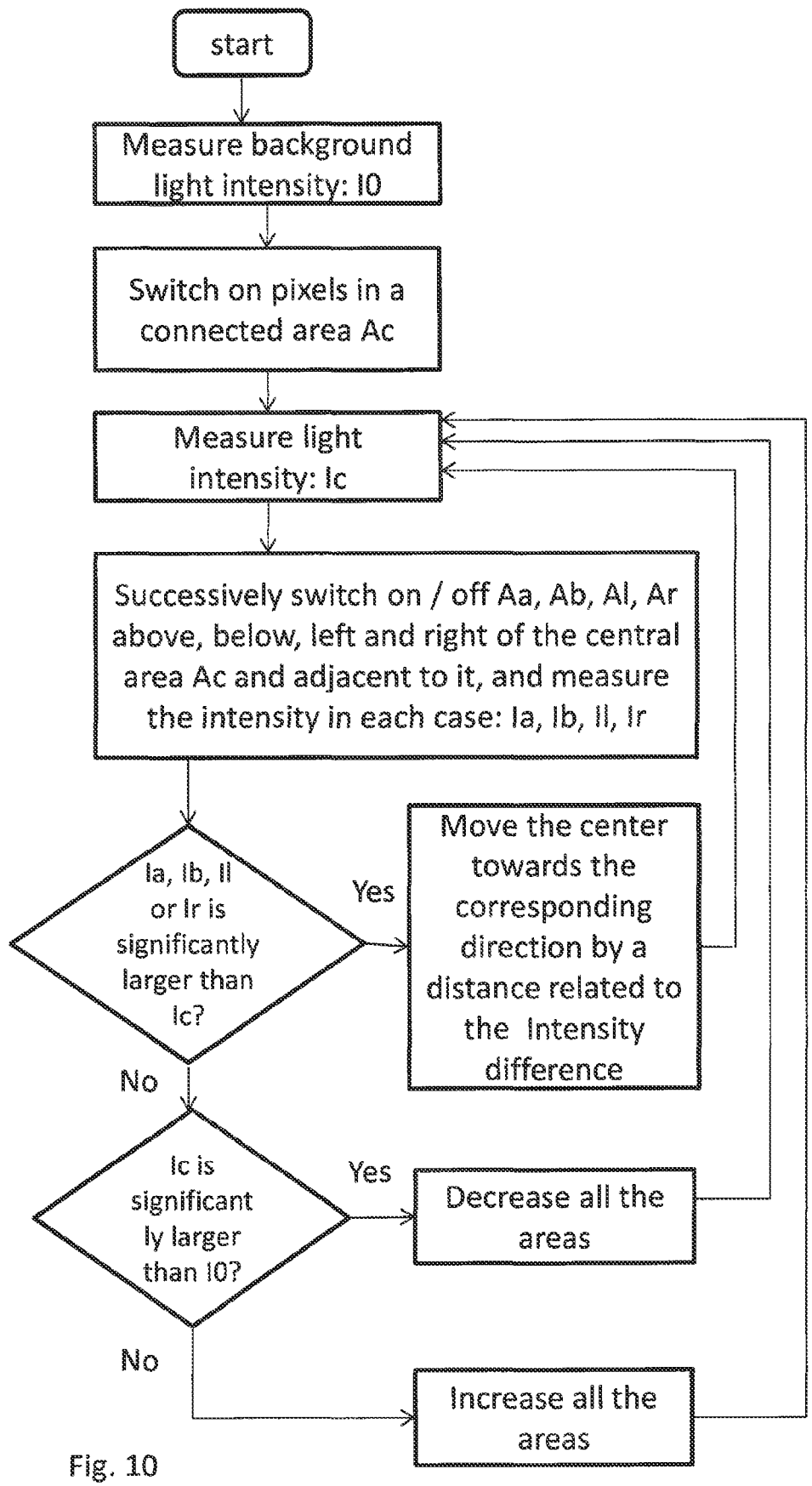
Figure 11:
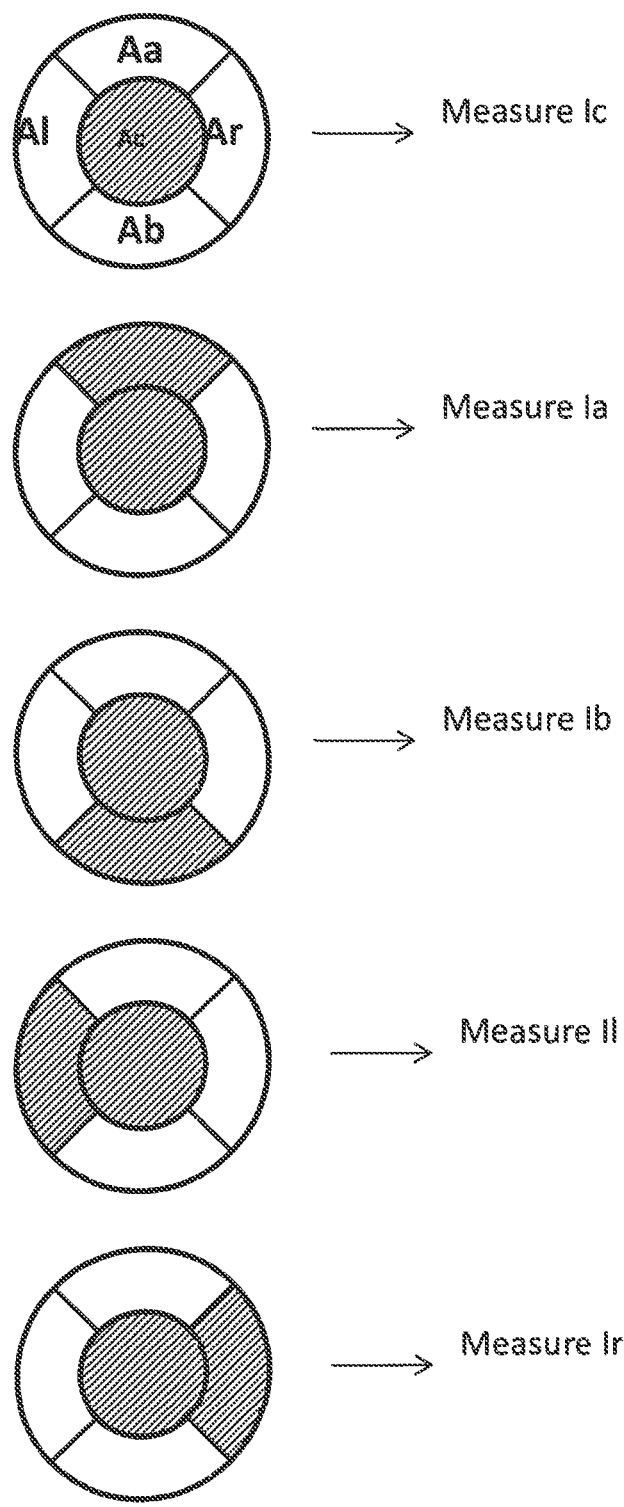
Figure 12A:
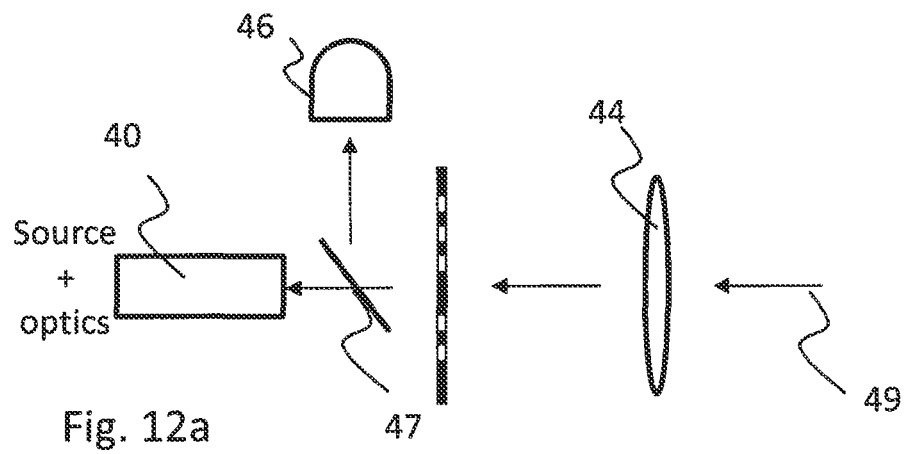
Figure 12B:
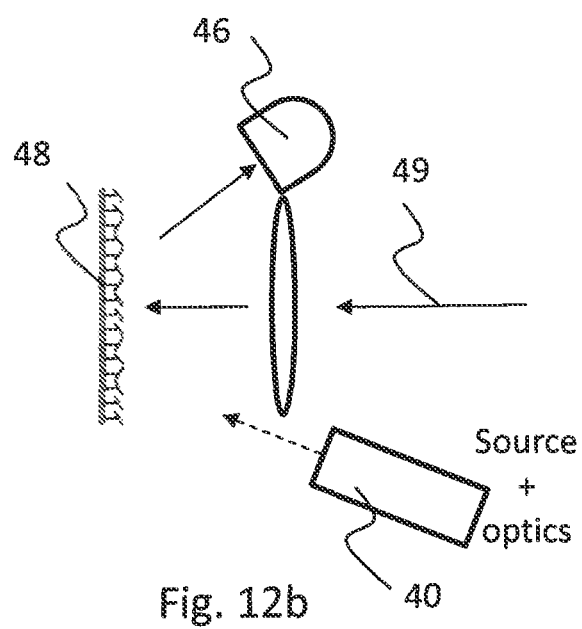

FIG. 6 shows a schematic example of a target receiving area in an area of projected pixels, FIGS. 7a to 7e shows an example of an iterative pixel selection, FIG. 8 is a flowchart in accordance with FIG. 7, FIG. 9 illustrates a target area located on a border region between areas of two differently switched pixels, FIG. 10 shows flowchart illustration another example for pixel selection, FIG. 11 shows possible areas for determinations in accordance with FIG. 10, and FIGS. 12a and 12b show schematic diagrams of emitting devices in accordance with further embodiments.

In the following certain exemplifying embodiments are explained in the context where directional optical signal transmission is provided between two apparatus, for example between two mobile devices or between a mobile device and a stationary terminal device.

A mobile device can be e.g. a handheld or otherwise portable device. A mobile device of a user for communications is often referred to as user equipment (UE) or terminal. A mobile device for implementing the embodiments may be provided by any device provided with optical communication apparatus for communication on an optical channel. The mobile device may also be capable of sending signals to and/or receiving wireless signals on a channel provided for example by a cellular system and/or a local wireless system. Non-limiting examples of mobile devices include a mobile station (MS) such as a mobile phone or what is known as a 'smart phone', a portable computer such as a laptop, tablet or a personal data assistant (PDA) provided with wireless communication capabilities, other portable device such as wearable wireless devices integrated with eyewear, helmets, hats, clothing and so on, universal serial bus (USB) sticks with wireless capabilities, modem data cards or any combinations of these or the like.

In FIG. 1 a system comprising devices 10 and 20 communicating via an optical link is shown. FIG. 1 shows a emitting or transmitting device 10 and a receiving or target device 20. The devices provide optical modules configured to send and receive optical signals. The receiving device 20 comprises a detector apparatus 21 with a known field of view. The receiving device may be provided with a possibility to adjust the direction of its filed of view. The emitting device 10 can be provided with a light source and an image projector 11. The image projector 11 produces an optical beam 13 directed to a target area on the receiving device. The beam is typically directed to an optical aperture 22 by emitting in an appropriate direction with an appropriate focus. The beam enters the receiver apparatus through the aperture. The aperture provides a field of view (FOV) of the receiving device that encompasses the emitter e.g. by looking in the appropriate direction with the appropriate focalization.

A radio frequency (RF) wireless link may also be provided between devices 10 and 20, should this be required by a particular application for example for communication of feedback information or other information. This is shown by the dashed line 14 between the devices. The RF link or other link for e.g. feedback can be provided directly between the devices or via e.g. a cellular system or a WLAN. The devices can be provided with a communication subsystem 15, 25 for the radio communications, for example with appropriate radio apparatus to facilitate wireless communications. It is noted that a communication channel between can also be provided based on other technologies.

Devices capable of communications on optical links are typically controlled by at least one appropriate controller apparatus so as to enable operation thereof and control various aspects of communications between the devices and/or other parties. The control apparatus can be interconnected with other control entities. FIG. 2 shows an example of control apparatus 30 capable of operating in accordance with the embodiments, for example to be coupled to and/or for controlling any of devices 10 and 20 shown in FIGS. 1, 5 and 6. The control apparatus can be configured to provide control functions in association with determination of various information, generation and communication of information between the various entities and/or control functions based on such information by means of the data processing facility thereof in accordance with the certain embodiments described herein. For this purpose the control apparatus comprises at least one memory 31, at least one data processing unit 32, 33 and an input/output interface 34. The control apparatus can be configured to execute an appropriate software code to provide the control functions. For example, the control apparatus can provide required functionality for control of determinations, measurements and steering, emitting, detecting, beaconing, decoding/encoding and/or other functionalities devices 10 and 20 and/or the optical modules thereof may have been provided with. The control apparatus and functions may be distributed between a plurality of control units. The data processing, storage and other relevant control apparatus may be provided on an appropriate circuit board and/or in chipsets.

The following discusses some examples of techniques for providing a directional link for optical communications between devices. In the examples directional selectivity is provided by compact and robust components, for example micro electro-mechanical systems (MEMs) or liquid crystals. Such components are already provided for other purposes in certain modern handheld devices such as some smart phones. The exemplifying arrangements can be applied to communications between mobile devices or to communications by at least one mobile device, for example to high-speed optical communication and unconditionally-secure quantum communication.

Projection display technologies can be used to transmit an optical signal in a selected direction. In projection technologies the directions in which the light is emitted are determined by an array of pixels producing an image on a distant surface. Projection systems are already included in certain smart phone devices and are expected to become more common. Adaptation of these systems for high-speed optical communication or unconditionally secure quantum communication can be provided without needing any significant additions to the hardware and/or requirement for additional space in the device.

In accordance with an aspect light can be emitted by the transmitting pixels only in the direction of a selected optical receiver(s). Only a few transmitting pixels can be switched on while all the other ones are off. The switching may depend e.g. on the distance, the size and/or shape of the target aperture of the receiver and so on. Although this can mean that most of the light produced by the emitter may not be used this loss is compensated by the optical communications being faster than radio communications.

FIG. 3 shows an example for operation for providing directional optical communications. In step 50 at least one pixel is selected from an array of pixels provided by an image projecting device for emitting light towards a target area of a receiving device. In 52 light is emitted by the selected at least one pixel towards the target area.

The selecting can comprise iteratively reducing the number of light emitting pixels of the array of pixels to be used for the communications.

If the optical link is based on protocols such as quantum key distribution (QKD) and faint pulses (these being the most common ones), any slight inefficiency should not be a problem at all as in such protocols light is attenuated anyway. Power is typically cut down in any case by many orders of magnitude before transmission in order to reach single-photon-level power. Use of only a part, or even one, of pixels in an array can be advantageously utilised to introduce inefficiency to the operation before transmission of a signal. As every photon that is not collected by a receiver can be used by a spy and can reduce the speed of communication, it is advantageous to send the photon only in one direction.

FIGS. 4a to c show three common types of pixel arrays used for projection devices. Projection devices are typically composed of a pixel array, a three-color light source 40 and appropriate optics 44. It is also possible to have a white source with three colour filters. The light source 40 can be used for optical communication. An additional or fourth light source in the case of a three colour source can be added to a device specifically for the purpose of communications. More particularly, FIG. 4a shows use of liquid crystals for a transmission array 41 where transmission and non-transmission pixels are provided. An example of such device is based on use of liquid crystal displays (LCD). FIG. 4b shows use of liquid crystals on silicon (LCoS) to provide reflection/no-reflection pixel array 43. FIG. 4c shows an array comprising a digital mirror device (DMD) 42. In such arrangement e.g. tilt up of a mirror element can result one or more pixels being switched off and tilt down of a mirror element can result one or more pixels being switched on. A configuration where each pixel is an emitter can also be used. In the case of classical communication, these can be provided e.g. by organic light emitting diodes (OLEDS).

Figure 5A:
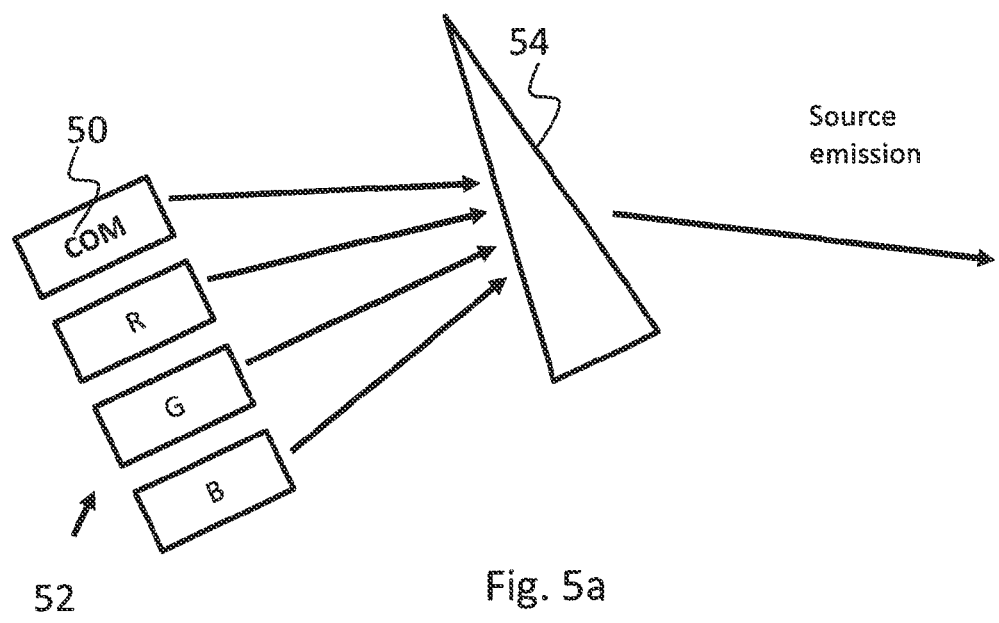
FIGS. 5a and 5b show examples of light sources.
Figure 5B:
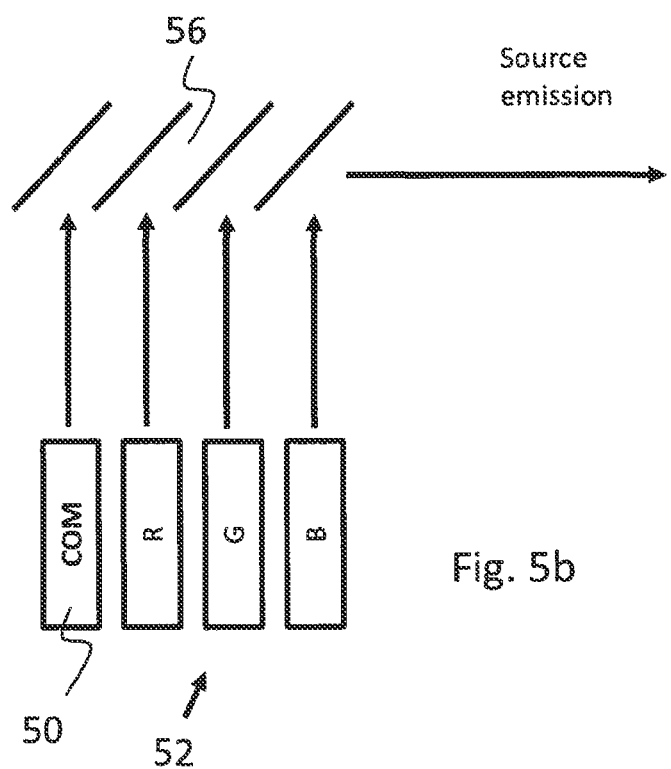

As mentioned above, a projection device light source can be modified to provide light for communications. In accordance with a possibility an emitter for communications 50 can be added to three colour light sources 52 for display as shown on FIGS. 5a and 5b. FIG. 5a further shows a dispersive element 54 for producing a source emission. FIG. 5b shows an example where dichroic mirrors or beam splitters 56 are provided for producing source emission.

FIG. 6 shows an example where only a few pixels 60 (in Figure the hashed pixels) are switched on to emit light in the direction of a receiver, and more particularly towards a target area in the form of an optical aperture (disk or the like) 62 of a receiver. The other pixels 61 are in off state In a scenario the pixels fill the entire area of the receiver's aperture. However, it can be sufficient if one pixel is directed to the aperture.

An optimal coupling of the light into the receiver can be provided by an emitter or receiver that is able to adjust its focus. However, enough power should be detected also if both emitter and receiver are focused near infinity and the field of view of the receiver is wide enough.

Before beginning communications between the devices a first step is the selection of appropriate pixels for emitting the optical signals. This can be done by starting emitting on a wide target area and based on receiver feedback on the intensity of the detected signal on the area. The target area the transmitter is aiming at can then be reduced until only the target area of the receiver is covered.

A possible iterative procedure is illustrated by FIGS. 7a to 7e. A flowchart for this procedure is also illustrated in FIG. 8. As shown in FIG. 7a, one half 72 of the area 70 can be switched off, the switched off area being denoted by the hashing. Loss of the signal can be considered to mean that the targeted receiver pixels i.e. the receiver aperture 76 are in the switched off half 72 of the area 70 and similarly, feedback that the signal is detected to means that the target is in the illuminated area 74. In the case of the determined light intensity being zero or close thereto, the pixels can be inverted, i.e. pixels that were on can be switched off and the pixels that were switched off can be turned back on to confirm that the target area is indeed in the other half.

If the signal level drops but is not completely lost this can be considered to mean that the aperture 76 of the receiver is in the border of on pixels 72 and off pixels 74. Thus it can be determined that the receiver pixels are on the boundary line between pixels that were switched on and off. This is illustrated in FIG. 9.

The procedure can be repeated by reducing the area to half between iterations as shown in FIGS. 7b and 7e until the target area 76 has been found. In FIG. 7c the target is in the non-projected area 72 and thus the other side 72 of the remaining area is targeted in FIG. 7d. By the iterations the emission area is gradually reduced to end up with only the necessary pixels, as shown in FIG. 7e.

FIGS. 10 and 11 illustrate another example for pixel selection. An example for a testing area is shown to have a circular shape that is divided into individually switchable subareas Ac, Aa, Ab, Al and Ar as shown in FIG. 11. The ratio between the sizes of the adjacent areas and the central area can be defined by an appropriate predetermined function. As shown in the flowchart of FIG. 10, background light intensity 10 can be measured first. Intensity Ic of a central area Ac is then measured. Areas Aa, Ab, Al, and Ar located above, below, on the left and on the right of the central area are then successively switched on and off. This is shown by the hashed areas on in each stage of FIG. 11. The intensity in each area is measured and thus Ia, Ib, Il and Ir are determined.

It is noted that this scheme of switching on and off is only an example, and that any area in at least three directions from the central area Ac and adjacent to it could be processed accordingly.

If it is determined that Ia, Ib, Il or Ir is larger than Ic by a predetermined amount indicative a significant difference the center area is moved towards the corresponding direction, as shown by FIG. 11. The amount of movement can be a distance that is related to the Intensity difference. The process then returns to the light intensity measurement of the center area. If none of the determined intensities satisfies this criterion it can be determined whether the intensity of the center area Ic is larger than IO. If yes, the size of all areas is decreased in size by a predetermined amount. If yes, all areas are increased in size by a predetermined amount. In either case the process returns to the light intensity measurement of the center area.

The iterations can be provided throughout communications on the optical link so that the system keeps on adjusting the pixel selection to accommodate any relative motion between the emitter and the receiver. The communication via the optical link is advantageously done at the same time e.g. simultaneously time or wavelength multiplexed when the transmission is considered to be good enough.

The iterative steering procedure is preferably run quickly. This can be assisted based beam steering technologies where sensors such as orientation, position and/or location detection is used. For example, a camera and sensors of a smart phone can be used to help steer a light beam in the right direction. In accordance with a possibility oscillations are caused to the beam. This can be provided by switching some pixels on and off very quickly. Feedback from the receiver is analysed to determine pixels that resulted detected of signal and the pixel(s) for the he beam can be selected based on this information.

In accordance with an embodiment a system for assisting in deciding which pixel(s) should be switched on can be provided. In order to avoid constant communication with the receiver, a beacon is provided to indicate the location of the receiver. The pixel array of the emitter is used in reception to select the direction in which the light is detected. Examples for this are shown in FIGS. 12*a* and *b* where beacon 49 received via the optics 44 and array arrangement for indicating the position of the receiver is provided. In any of the three technologies shown on FIGS. 4*a* to *c*, it is possible to add a beam splitter 47 in front of the source 40 to direct light coming from the beacon 49 and indicating the position of the receiver towards a detector 46, as shown in FIG. 12*a*. In the case of the DMD of FIG. 12*b*, the beam splitter is not necessary because the micro-mirrors 48 can be tilted in two directions, one towards the light source for emission/projection (e.g. tilt down) and the other for the detection (e.g. tilt up). In operation the determining can be started by switching the light on at the receiver so that it covers a wide area at the emitting device and then check whether the detector 46 "sees" the beacon from the receiver, and gradually reduce the area until relevant pixels pointing to the target area of the receiver can be determined.

It can be assumed that the receiver has a field of view wide enough or adjusted to encompass the emitter. Pointing the field of view in a selected direction can be performed with the help of e.g. moving lenses, rotating mirrors, phase arrays or by moving the whole receiver.

The above described steering arrangement has various applications. For example, it can be advantageously used for ultra high-speed data transfer between mobile devices or a mobile device and a stationary device within line of sight. This can be used for example to enable secure communications or payments between a mobile device and a server, a machine type terminal or the like. Both devices can be mobile devices.

According to an example appropriate apparatus or means are provided for controlling a device, for example a handheld of otherwise mobile device, to provide the various embodiments. For example, there can be provided an apparatus for providing directional optical communications, comprising means for selecting at least one pixel from an array of pixels provided by an image projecting device for emitting light towards a target area of a receiving device, and means for emitting light by the selected at least one pixel towards the target area. In accordance with another aspect there is provided an apparatus for directional optical communications, the apparatus comprising image projecting means comprising at least one light source and comprising means for providing an array of pixels, and controller means for controlling directional emission of light by the pixels of the array to emit light towards a target area of a signal receiving device by selected at least one pixel. In accordance with an example means for iteratively reducing the number of light emitting pixels is provided.

It is noted that whilst embodiments have been described using a mobile device as an example, similar principles can be applied to any other device capable of optical links and where alignment is needed between the devices. Therefore, although certain embodiments were described above by way of example with reference to certain exemplifying mobile devices and technologies, the principles can be applied to any other suitable forms of devices than those illustrated and described herein.

The required data processing apparatus and functions at the relevant devices may be provided by means of one or more data processors. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

The herein described examples can be provide certain advantages. For example, ultra-high-speed file transfer between mobile devices can be provided. QKD can be taken into use as a commercial application because technology that is already included in certain mobile devices can be utilised.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for providing directional optical communications, comprising
    selecting at least one pixel from an array of pixels provided by an image projecting device in a projection display system for emitting light towards a target area of a receiving device, wherein the selecting comprises iteratively reducing the number of light emitting pixels of the array of pixels;
    emitting light by the selected at least one pixel towards the target area; and
    a) dividing the array of pixels into sub-arrays,
    b) switching off pixels of a sub-array and emitting light by pixels of another sub-array,
    c) determining that the receiving device receives light emitted by the pixels of the light emitting array,
    d) dividing the light emitting sub-array into further sub-arrays, and
    repeating steps b) to d) until the target area of the receiving device is determined.

2. A method according to claim 1, comprising dividing the light emitting array of pixels in two parts in each iteration, and selecting in each iteration the one of the two parts which produces a detectable signal.

3. A method according to claim 1, comprising determining based on information of a reduced signal power that the target area is on a boundary between a switched-off sub-array and a light emitting sub-array of pixels.

4. A method according to claim 1, comprising selecting the at least one pixel at least in part based on feedback from the receiver device.

5. A method according to claim 4, wherein the feedback comprises information on intensity of detected signal transmitted by pixels of the array of pixels.

6. A method according to claim 1, comprising emitting the light by one or more light sources of the image projecting device or by at least one additional light source provided in association with the image projecting device.

7. A method according to claim 1, wherein the image projecting device produces the pixels by means of at least one of a transmission pixel array, a reflection pixel array, a digital mirror device, and light emitting pixels.

8. A method according to claim 1, comprising receiving a beacon from the receiving device and determining the at least one pixel for transmission towards the target area at least in part based on the beacon.

9. A method according to claim 1, wherein the communication comprises at least one of communication according to a quantum key distribution protocol and communication of data.

10. An apparatus for controlling use of an image projecting device in a projection display system for directional optical communications, the apparatus comprising at least one processor, and at least one memory including computer program code, wherein the at least one memory and the computer program code are configured, with the at least one processor, cause the apparatus at least to select at least one pixel from an array of pixels provided by the image projecting device for emitting light towards a target area of a signal receiving device, wherein the selecting comprises iteratively reducing the number of light emitting pixels of the array of pixels, measure background light intensity, switch on pixels in a first area of a measurement pattern and measure received light intensity for the first area, successively switch on at least one second neighboring area of the measurement pattern and measuring received light intensity for the at least one second area, and determine whether any second area has light intensity greater than the light intensity of first area, and in response thereto, if a second area has a greater light intensity, move the measurement pattern towards such second area, and if no second area has a greater light intensity, determine if the light intensity of the first area is significantly larger than the background light intensity.

11. An apparatus for directional optical communications, the apparatus comprising
    an image projecting device comprising at least one light source and configured to provide an array of pixels for emitting light towards a target area of a receiving device, and
    a controller configured to control selection of at least one pixel from the array of pixels, control directional emission of light by the pixels of the array to emit light towards a target area of a signal receiving device by selected at least one pixel, iteratively reduce the number of light emitting pixels of the array of pixels, measure background light intensity, switch on pixels in a first area of a measurement pattern and measure received light intensity for the first area, successively switch on at least one second neighboring area of the measurement pattern and measuring received light intensity for the at least one second area, and determine whether any second area has light intensity greater than the light intensity of first area, and in response thereto, if a second area has a greater light intensity, move the measurement pattern towards such second area, and if no second area has a greater light intensity, determine if the light intensity of the first area is significantly larger than the background light intensity.

12. An apparatus according to claim 11, configured to select the at least one pixel at least in part based on feedback from the receiver device, the feedback comprising information on detected light intensity.

13. An apparatus according to claim 11, configured to provide the light by one or more light sources of the image projecting device or by at least one additional light source provided for the communications in association with the image projecting device.

14. An apparatus according to claim 11, wherein the image projecting device comprises at least one of a transmission pixel array, a reflection pixel array, a digital mirror device, and light emitting pixels.

15. An apparatus according to claim 11, comprising a beacon detector, and configured to determine the at least one pixel for transmission towards the target area at least in part based on a beacon by the receiving device.

16. An apparatus according to claim 15, comprising at least one of beam splitter and reflector for guiding the beacon to the detector.

17. A method comprising for providing directional optical communications,
    selecting at least one pixel from an array of pixels provided by an image projecting device in a projection display system for emitting light towards a target area of a receiving device, wherein the selecting comprises iteratively reducing the number of light emitting pixels of the array of pixels;

emitting light by the selected at least one pixel towards the target area;

measuring background light intensity;

switching on pixels in a first area of a measurement pattern and measuring received light intensity for the first area;

successively switching on at least one second neighboring area of the measurement pattern and measuring received light intensity for the at least one second area;

determining whether any second area has light intensity greater than the light intensity if first area, and in response thereto, if a second area has a greater light intensity, moving the measurement pattern towards such second area, and if no second area has a greater light intensity, determining if the light intensity of the first area is significantly larger than the background light intensity.

\* \* \* \* \*